Feb. 5, 1963 F. A. SCHWERTZ 3,076,968

ELECTROSTATICALLY RECORDING PLURALITY OF SIGNAL BITS SIMULTANEOUSLY

Filed Sept. 12, 1957 5 Sheets-Sheet 1

INVENTOR.
Frederick A. Schwertz

BY
George W. F. Simmons

ATTORNEY

Feb. 5, 1963 F. A. SCHWERTZ 3,076,968

ELECTROSTATICALLY RECORDING PLURALITY OF SIGNAL BITS SIMULTANEOUSLY

Filed Sept. 12, 1957 5 Sheets-Sheet 2

INVENTOR.
Frederick A. Schwertz
BY
George W. F. Simmons
ATTORNEY

INVENTOR.
Frederick A. Schwertz
BY
George W. F. Simmons
ATTORNEY

Feb. 5, 1963 F. A. SCHWERTZ 3,076,968

ELECTROSTATICALLY RECORDING PLURALITY OF SIGNAL BITS SIMULTANEOUSLY

Filed Sept. 12, 1957 5 Sheets-Sheet 4

INVENTOR.
Frederick A. Schwertz
BY
George W. F. Simmons
ATTORNEY

INVENTOR.
Frederick A. Schwertz
BY
George W. T. Simmons
ATTORNEY

United States Patent Office 3,076,968

Patented Feb. 5, 1963

3,076,968
ELECTROSTATICALLY RECORDING PLURALITY OF SIGNAL BITS SIMULTANEOUSLY

Frederick A. Schwertz, Pittsford, N.Y., assignor to Xerox Corporation, a corporation of New York Filed Sept. 12, 1957, Ser. No. 683,647
7 Claims. (Cl. 346—74)

The present invention relates to a system for visual display of information carried as electrical intelligence in an amplitude- or pulse-time division form; and more particularly it involves the electrical analysis of such intelligence, and the presentation thereof as a directly readable and permanent or semi-permanent visual record.

In the computer, television, and radar arts, for example, there are numerous instances where an entity of intelligence is carried in the electrical phase as a plurality of discrete pulses or different voltages divided on or extending along a time scale. In order to reduce these bits of information into an intelligible entity, they must be presented in accordance with a known plan keyed to the time code or base, and transduced from the electrical form to one that can be directly sensed, such as an aural or visual presentation. In general, the present invention is concerned with a system for electrically identifying each bit of amplitude- or pulse-time division information going to make up an entity of intelligence, and applying the bits into a spatial pattern in accordance with the preestablished time division plan. The system further embraces transducing the spatial pattern of bits into an intelligible visual record of the information entity thus derived. More specifically, the present invention contemplates a plurality of fixedly oriented electrodes, each intended to carry or present an individual bit of an information entity received by the system. A time referenced electrical analyzer, keyed to the preestablished time base pattern of intelligence reception, is used to selectively energize the several electrodes in accordance with the bits of information going to make up the entity of intelligence received. Pursuant to one approach of the present invention, the analyzer may function to energize the several electrodes sequentially as each respective bit of information is received; and in accordance with a second approach, the information bits may be stored in the analyzer until an entire entity of intelligence has been received, whereupon all the bits may be simultaneously applied to their respective electrodes, to convey, at once, the entity of intelligence as a whole. With either type analyzer, the information bits appearing at the electrodes are transduced into a visual record by transfer of electrostatic charge from the electrodes to a web or sheet of electrically insulating material, whereby an electrostatic pattern of the information bits is formed on the insulating material. By the selective deposition of a suitable developing material in accordance with the charge pattern carried by the insulating sheet or web, an image of the entity of intelligence presented by the electrodes is developed, to provide a visual presentation of the intelligence received. If desired, the developed image may be further treated to establish a permanent record.

It is therefore one object of the present invention to provide a system for interpreting and visually presenting intelligence received in an amplitude- or pulse-time division form.

Another object of the present invention is to provide a system of the type indicated, wherein the bits of information presented in amplitude- or pulse-time division form are analyzed and visually presented in a spatial array in accordance with a predetermined time base key.

A further object of the present invention is to provide a system of the foregoing type, wherein the bits of information are presented in keyed spatial array, sequentially.

Still another object of the present invention is to provide a system as above indicated, wherein the bits of information constituting an entity of intelligence are presented in keyed spatial array, simultaneously.

Other objects and advantages of the present invention will become apparent to those skilled in the art from the following description of several exemplary specific embodiments of the present invention, had in conjunction with the accompanying drawings, wherein.

Figure 1:
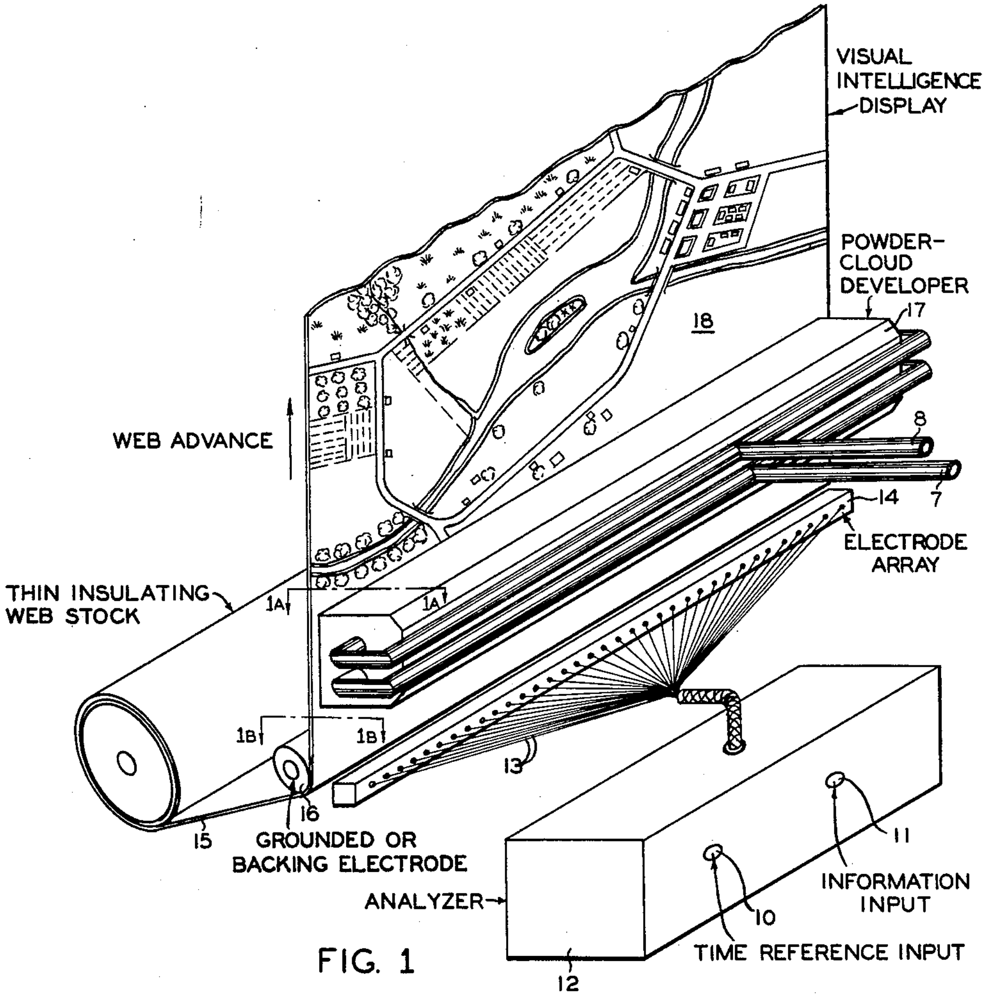
FIGS. 1, 1A and 1B are schematic illustrations of the basic components of the present system.

Referring to FIG. 1, the general organization of the present system is illustrated. As there shown, the system has two electrical inputs, the information input at 11, and a time reference input at 10, both feeding the electronic information analyzer, generally indicated by numeral 12. The output of the analyzer 12 is denoted by a plurality of leads 13 individually connected to respective discharge electrodes, arranged in a desired spatial array within the housing 14. The output of the analyzer 12 as transduced by the electrodes, is in the form of selective and/or varying degrees of electrical discharge from the respective electrodes to a web 15 of thin insulating stock. The discharge pattern adduced by the electrodes at 14 is thus transferred or established upon the section of web 15 juxtaposed thereto, as an electrostatic charge forming a corresponding electrostatic charge pattern. Web 15 is advanced in the direction of the arrows in synchronism with or at a speed related to the input of information to the analyzer, to carry the established charge pattern past a powder cloud developer, or equivalent means, 17. At the developer 17, a powder, ink, or like material is selectively deposited on the web 15 in accordance with the charge pattern carried by the web, to provide a visual display of the intelligence, as generally indicated at 18. As herein depicted for purposes of example, the intelligence presented at 18 is a picture of the terrain of an area of land, as may have been presented at the information input by a radar type of sensing system, or by a television camera tube type of sensing system.

Figure 2:
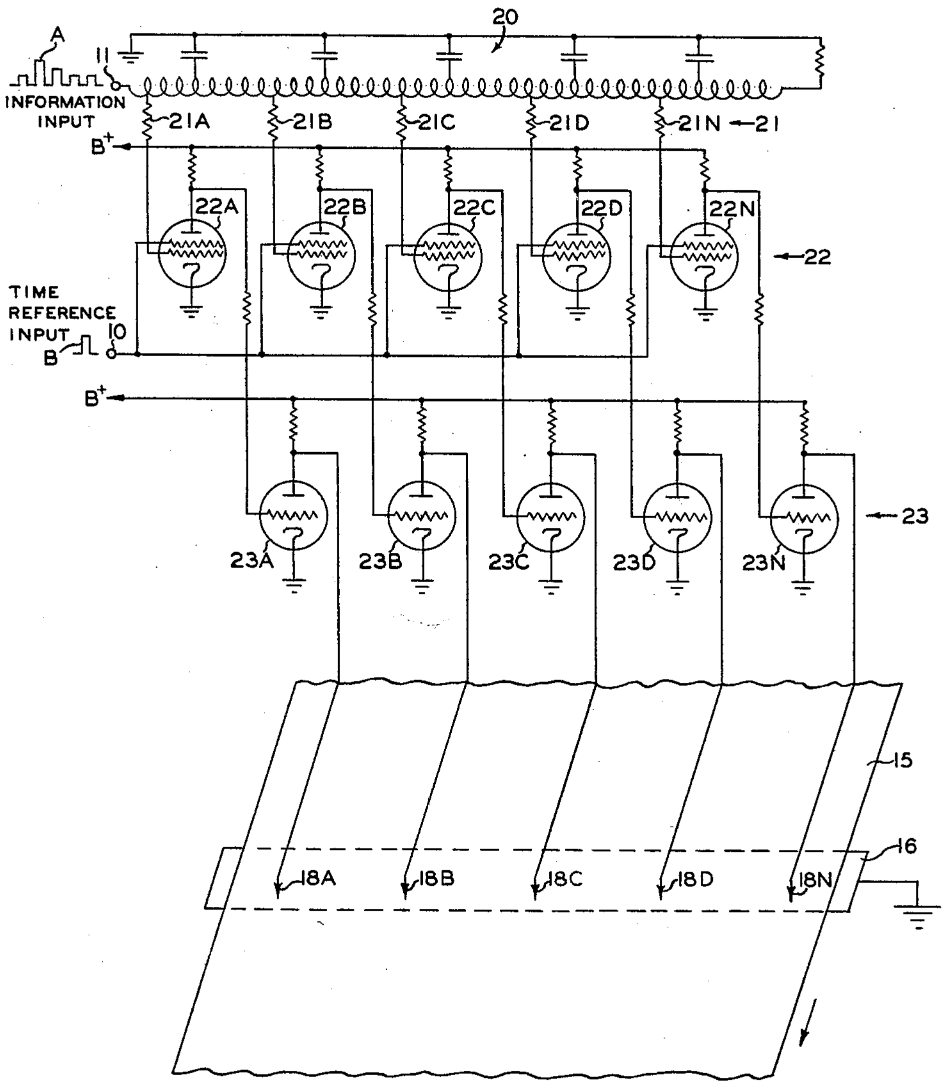
FIGS. 2 and 2A are schematic wiring diagrams of the analyzer, embodying one approach therefor.

Referring more particularly to the analyzer 12, as previously mentioned it is intended to analyze information bits fed thereto in the form of an amplitude- or pulse-time division pattern through input 11, and to correlate these bits into an entity of intelligence through a predetermined time key existing in the pattern of information bits, and established in the analyzer by its circuits, the time reference input at 10, and the spatial array of output electrodes at 14. One embodiment of the analyzer 12 is schematically shown in FIG. 2, utilizing a delay line 20 as the information input circuit, receiving through terminal 11 pulse-time division intelligence, of which one entity of information in electrical form is depicted at A. Delay line 20 is tapped at a plurality of selected points therealong definitive of the time base key of the electrical information, with each tap feeding a respective stage of a bank of gating amplifiers 22 through a corresponding resistor 21. These resistors 21*a* . . . 21*n* are chosen with appropriately decreasing values, so as to compensate for signal attenuation along the delay line and enable the voltage values applied to the gates 22 therefrom to have the same relative values as when applied to the line input 11. A time reference signal B is applied to the analyzer through terminal 10, and fed simultaneously to all the stages of the gating amplifier bank 22. The time reference pulse B is keyed to the information input A in such a relationship that a pulse B appears at 10 at each instant that a complete entity of intelligence A appears at the proper position along the delay line 20 to be read out through resistors 21. Thus, when the entire intelligence A is appropriately distributed along delay line 20, a pulse B is applied simultaneously to each of the stages of bank 22.

Each of the gating amplifiers 22*a* . . . 22*n* comprises a multi-grid vacuum tube, with the respective delay line tap feeding one grid and the input 10 feeding another grid. The parameters of the gating amplifier circuit are chosen such that each tube 22*a* . . . 22*n* is biased below cut off when no signal A or B appears on the grids thereof. The parameters are further chosen such that the application of pulse B alone functions merely to bring the tubes only approximately up to or slightly below the cut off threshold, and the application of pulses A alone, without coincident application of a pulse B, cannot cause the gating amplifiers to conduct. With a pulse B appearing at each of the tubes 22*a* . . . 22*n*, then the degree of conduction through each tube becomes a function of the amplitude of that portion of signal A being applied thereto. In other words, the output of each gating tube 22*a* . . . 22*n* is a function of that bit of information applied thereto at the instant that the time reference input B is applied to the circuit. In the general operation of this circuit, it will thus be appreciated that a full entity of intelligence is applied to delay line 20. With this full entity thus in the circuit, a time reference pulse B is applied, resulting in the gating amplifiers 22 passing simultaneously and separately each information bit composing signal A. This entity of intelligence having been thus read out of the delay line, it proceeds to pass off the delay line as a second entity begins to appear at 11 and pass down the delay line. At an appropriate time, the first entity has passed off the line, the succeeding entity is in position to be read out, and a next pulse B is applied at 10 to read out at once the latter entire entity of intelligence. Obviously, the production of time reference pulses B must be appropriately keyed to the circuitry presenting the information A to the delay line. The means for accomplishing this end will be readily apparent to those skilled in the art, and since it forms no part of the present invention, the circuit therefor is not shown.

The plate outputs of gating amplifiers 22*a* . . . 22*n* are applied to the grids of corresponding respective amplifiers 23*a* . . . 23*n*, comprising the amplifier bank 23. Since with no output from gates 22*a* . . . 22*n* their plate potentials are at a maximum positive value, the normal state of amplifiers 23*a* . . . 23*n* is at maximum conduction, placing their plate outputs at a minimum positive potential. The plate outputs of amplifiers 23*a* . . . 23*n* are applied to respective discharge electrodes 18*a* . . . 18*n*, and the parameters of the system are chosen such that this minimum potential places the discharge electrodes at their effective discharge threshold, or slightly therebelow, with respect to the ground plate 16. Therefore, when, and only when, the gating amplifiers 22*a* . . . 22*n* are passing an information output, resulting in an increase in the plate output potentials of corresponding amplifiers 23*a* . . . 23*n*, do the corresponding electrodes 18*a* . . . 18*n* effect an electrical discharge appropriate for producing a corresponding electrostatic charge on insulating web 15. The resulting electrostatic charge pattern on web 15 is thus a record of the entity of intelligence applied at 11. Since the magnitude of output of each emplifier 23*a* . . . 23*n* is made a function of the amplitude of the corresponding input pulse of signal A, the density of the resulting charge established by the corresponding electrode is a function of said pulse amplitude; hence, the system is capable of obtaining half tone definition in its intelligence record.

By an appropriate selection of the spatial array of electrodes 18*a* . . . 18*n* relative to the time relation of information bits contained in signal A, the resulting electrostatic charge pattern on web 15 may be a directly intelligible form of information. This charge pattern, to be readable, must of course be rendered visible by development, as will be described subsequently. In the present embodiment, the entity of intelligence to be adduced on web 15 is a line of scan of an area of terrain, as derived in electrical form by radar or television scan, for example. Accordingly, the correlation of the spatial arrangement of electrodes 18*a* . . . 18*n* with the time pattern of the information bits contained in the signal A is one requiring a linear array of the electrodes across web 15. It is apparent, however, that with different forms of intelligence, such as an alphabetical or numerical intelligence, the array of the electrodes would be different. Once having appreciated and understood the principles of the present invention from the foregoing specific embodiment, the selection of an appropriate array of electrodes for any particular purpose will be readily apparent to those skilled in the art.

In connection with the foregoing specific embodiment of the analyzer, it should be pointed out that, if desired, the information and time reference inputs could be reversed. That is, the time reference pulses B could be applied to the delay line 20, and the information input signals applied directly and simultaneously to all the gating tubes 22*a* . . . 22*n*. In this instance, the pulse B would travel down the delay line to condition each tube 22*a* . . . 22*n* in sequence. Synchronized with the pulse B, the information pulses contained in signal A would in sequence be each applied to all the gating tubes in the bank 22. By this mode of operation, it is apparent that each gating tube would have an output only in response to that information bit to which it is intended to respond, since with the appearance of each information pulse, only the appropriate tube 22*a* . . . 22*n* would be conditioned to respond by the time reference pulse on delay line 20.

Figure 2A:
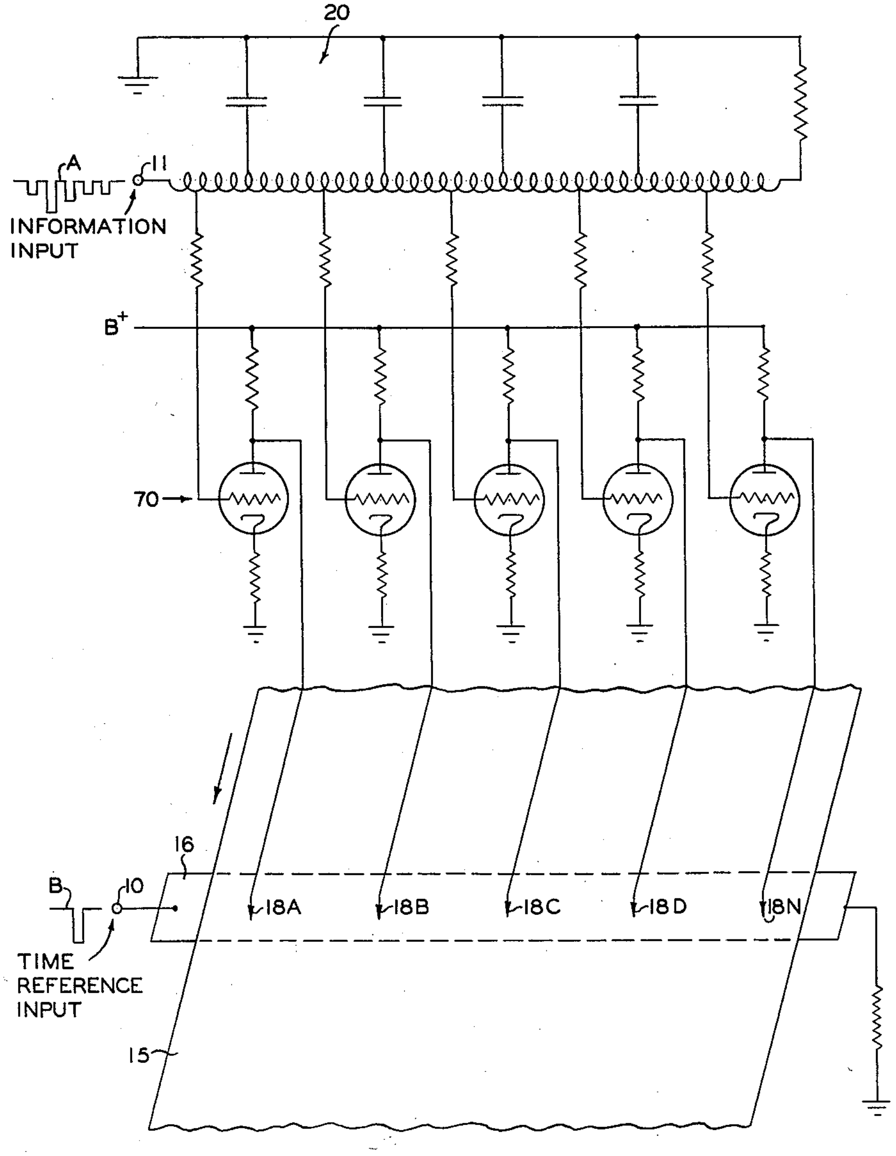

A simplified modification of the delay line system of FIG. 2 is shown in FIG. 2A. Here the intelligence information A in negative pulse form is applied along delay line 20, and amplified at 70 to provide at electrodes 18*a* . . . 18*n* a pattern of voltages proportional to the incoming intelligence in signal A. Synchronized with the intelligence signals, and when a complete entity of intelligence is present and appropriately positioned on the delay line, a negative time reference pulse is applied to the backing electrode 16, to cause the electrodes 18*a* . . . 18*n* to discharge with intensities related to the respective information bit pulses of signal A. The negative pulse B should itself be of a magnitude sufficient to place the electrodes 18*a* . . . 18*n* at approximately their discharge potentials in the absence of a signal A, whereupon the resultant discharge of an electrode 18*a* . . . 18*n* would indicate the presence of an information bit pulse thereat, and the intensity of charge established on web 15 at such electrode would indicate the amplitude of that information pulse.

Figure 3:
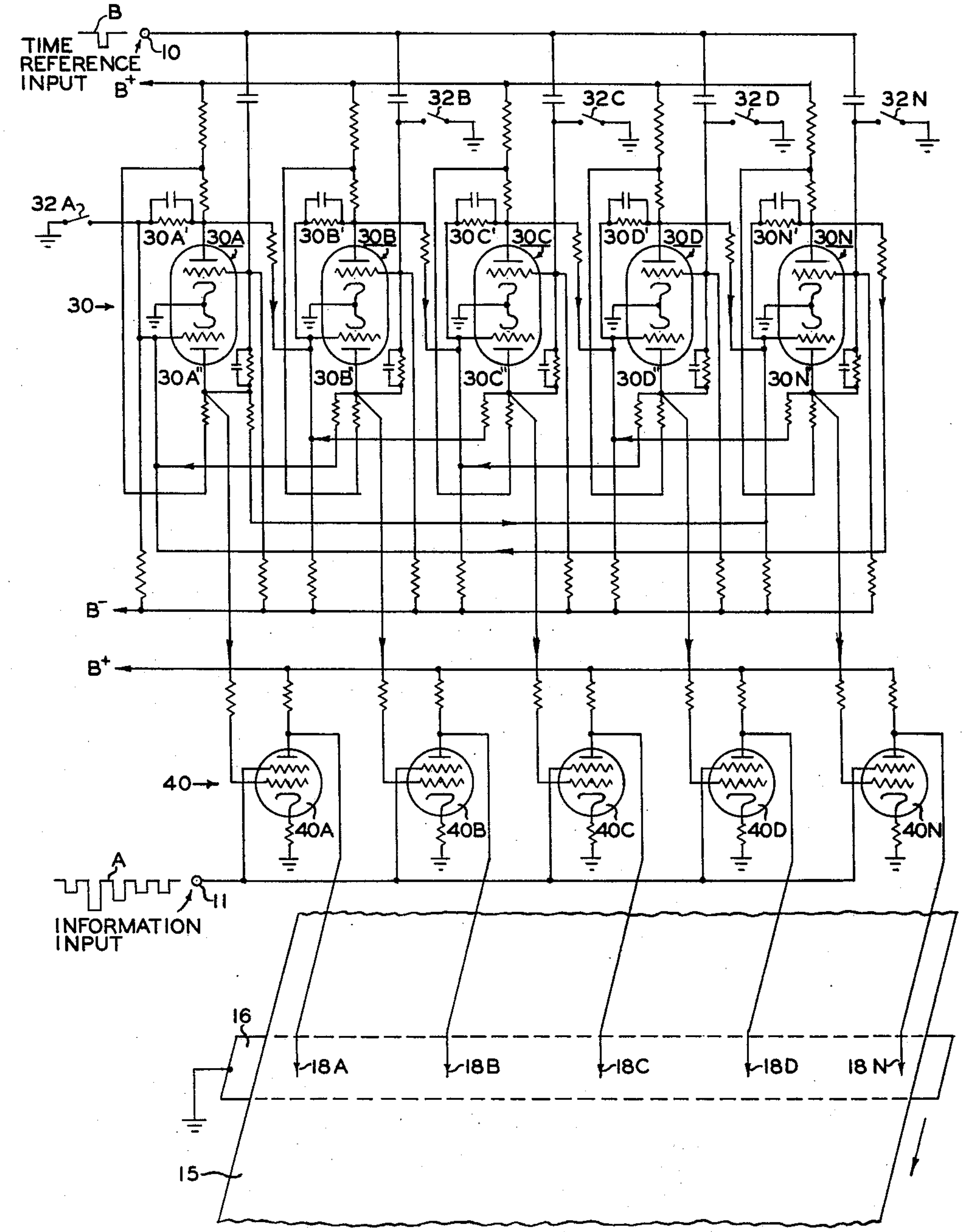
FIG. 3 is a schematic wiring diagram of the analyzer, embodying a second approach therefor.

A further embodiment of analyzer 12 is shown in FIG. 3, and basically comprises a ring counter chain 30 operating to condition gating amplifiers in bank 40 sequentially. As thus conditioned, the gates operate to pass appropriate information bits contained in signal A at input 11 to corresponding discharge electrodes 18*a* . . . 18*n*.

The ring counter chain 30 may be of any suitable design. For purposes of illustration, one such chain is schematically shown in FIG. 3, and is of the type more full disclosed and explained in U.S. Patent 2,402,432, issued to Robert E. Mumma on June 18, 1946. This ring counter chain includes a plurality of stages 30*a* . . . 30*n*, each of which comprises a vacuum duo-triode, or pair of triodes, interconnected to function basically as a flip-flop circuit. In order to establish an initial condition for the chain, each flip-flop stage is provided with a mechanical switch 32*a* . . . 32*n*. With the supply potentials applied, when said switches are simultaneously and momentarily closed an initial condition is established wherein triode 30a″ is conducting with triode 30a′ cut off, and triodes 30b″ . . . 30n″ are cut off with triodes 30b′ . . . 30n′ conducting. The switches are then opened, and the counter chain is ready to function.

With the first negative time reference input pulse B applied at terminal 10, each of the grids of 30a′ . . . 30n′ is driven negatively. This has no effect on 30a′ which is already cut off, and the magnitude of the pulse is chosen as insufficient to override the negative biases on tubes 30c″ . . . 30n″ to the extent necessary to flip these stages. However, because of the relatively positive bias on tube 30b″ due to the feed thereto from relatively positive plate of cut off triode 30a′, the pulse B is sufficient to flip stage 30b. When 30b flips, the plate of triode 30b″ goes from cut off to conduction, causing the plate potential thereof to go in a negative direction. Since the negative going plate potential of 30b″ is fed back to the grid of triode 30a″, triode 30a″, which had been conducting, is moved toward cut off sufficiently to cause stage 30a to flip. Thus the count has moved one stage down the ring. In a like manner, each subsequent pulse B moves the count one stage down the chain; and since the chain is connected in ring formation, the pulse B following the count at stage 30n places the count back at stage 30a.

At the outset it was noted that triode 30a″ was conducting, and triodes 30b″ . . . 30n″ were cut off. Thus the counter output from the plates of 30a″ . . . 30n″ to the bank of gating amplifiers 40 is, at stage 30a, relatively negative, and at stages 30b″ . . . 30n″, all relatively positive. At each count of pulses B, the one relatively negative output is moved down the chain one stage, while the preceding stage is returned to a relatively positive output.

The outputs of the counter chain stages are coupled respectively to one grid of the multigrid gating amplifiers 40a . . . 40n. The negative information signals A at input 11 are coupled simultaneously to another grid of all the gating amplifiers. The plate outputs of the gating amplifiers are in turn coupled respectively to the discharge electrodes 18a . . . 18n. The parameters of the gating amplifiers 40a . . . 40n are chosen such that a relatively negative output from the counter chain alone reduces conduction through the respective gate sufficiently to raise its plate output approximately to the effective discharge potential of the respective discharge electrode. The occurrence of a negative going information bit pulse from intelligence signal A also causes a reduction in conduction through the gates 40a . . . 40n, resulting in a discharge from the electrode 18 corresponding to the count existing on chain 30, to the web 15 and ground plate 16. The intensity of this discharge is thus approximately related to the magnitude of the information bit pulse. The parameters of the gating circuits are further established, and the magnitude of information pulses A are limited, such that for any gating stage coupled with a relatively positive output counter stage, the negative information pulses cannot lower conduction through said gating stage sufficiently to cause the plate output to pass the effective electrode discharge threshold. Consequently, each information bit is "printed out" by electrical discharge at that electrode only which is appropriate, as established by the keying of time reference pulses B with the application of intelligence to the gating amplifiers 40a . . . 40n. By means well known in the art, and forming no part of the present invention, the sequence of time reference pulses B can be readily synchronized with the information bit pulses, to step the counter 30 one count for each information bit. A run through the entire sequence of discharge electrodes thereby provides, through their spatial array, a presentation of an entity of intelligence upon the web 15, as will be understood from the description heretofore presented in connection with the analyzer embodiment shown in FIG. 2.

Such a device is particularly adaptable to high resolution strip radar recording. Thus, if the radar is scanning an area of 40 miles, the recording interval will be $4\times10^{-4}$ seconds. In this time interval a megacycle ring counter will record 400 counts. Since this is about the number of electrodes required per lineal inch, a 5-inch recording field would call for a 5 megacycle counting rate. Even wider strips may be used, if desired, as transistor ring counters have been operated at frequencies up to 100 megacycles per second.

Figure 4:
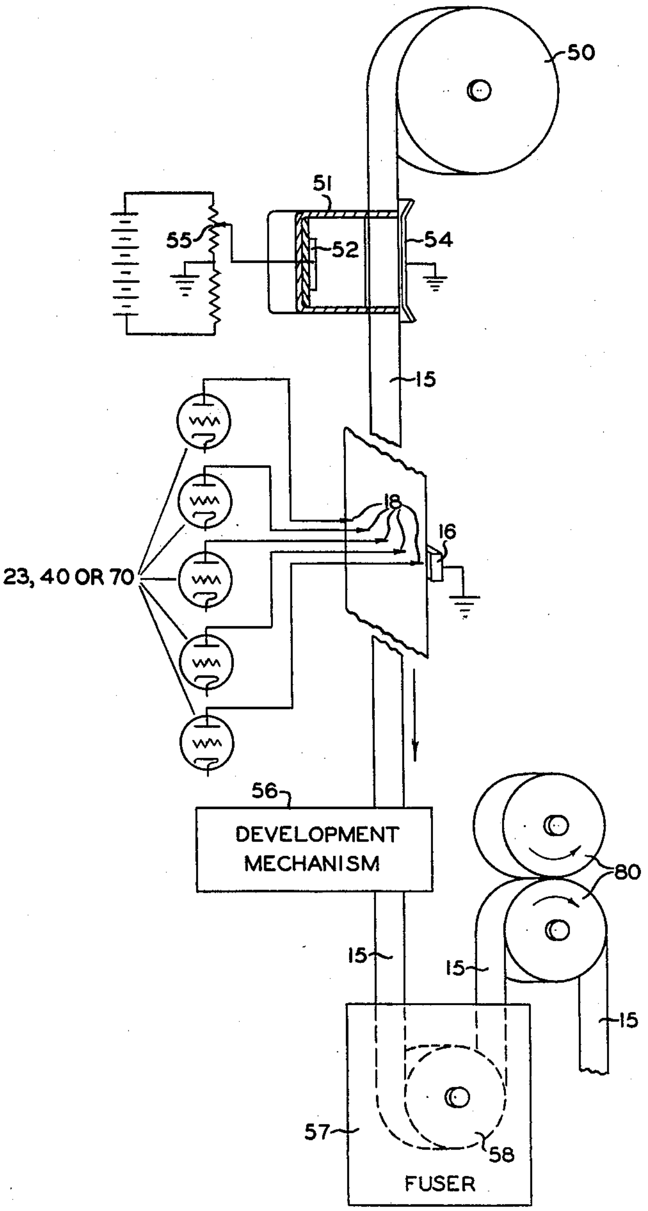
FIGS. 4 and 5 are schematic illustrations of a recording system for the present invention.
Figure 5:
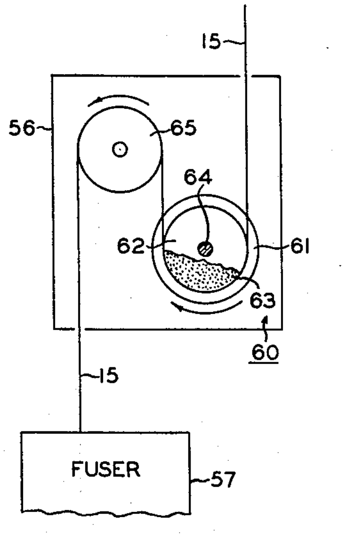

With reference to FIGS. 4 and 5, there is presented the principles of, and an exemplary mechanism for, transducing into visual form the electrical intelligence obtained at the outputs of amplifiers 23 in FIG. 2, amplifiers 70 in FIG. 2A, or gating amplifiers 40 in FIG. 3. The thin electrically insulating web 15 drawn from supply roll 50 may be a plastic film, such as polyethylene terephthalate, polystyrene, cellulose acetate, ethyl cellulose, or like sheet material of good insulating properties, and preferably of the order of one or two mils thick; or it may be of paper coated on the working surface with one of these plastics, or with a wax; or in some instances thoroughly dry paper or cellophane can be used. As the web 15 is drawn from its roll, it first passes through a preliminary charging device 51, where the web is brought to a uniform state of electrostatic charge. From the preliminary charger, the web is then passed between the information transducing discharge electrodes 18 adjacent one surface of the web, and the ground plate 16 adjacent the opposite surface, where an electrostatic charge pattern depicting the intelligence is adduced on the web. The web then enters a development mechanism 56, where the electrostatic charge pattern on the web is rendered visible by the selective application of a finely divided material, such as electroscopic powder, or a liquid ink, or like material. As the web emerges from the developer, the intelligence carried thereon is visually intelligible, as indicated on web section 18 of FIG. 1. Where a permanent record of the intelligence is desired, the web is then passed to fuser 57, where the powder is permanently fused to the web, or the ink is dried. As is apparent, if only a transitory presentation of the intelligence is desired, the fuser may be omitted, and instead of a fresh web supply roll, the web may be in the form of an endless belt, with means interposed between the developer 56 and the preliminary charger 51, on the return side, to clean the intelligence off the web.

The purpose of preliminary charger 51 is to establish over the web a uniform electrostatic charge preparatory to receiving the intelligence charge pattern. Charger 51 comprises a housing within which is located an electrode 52 coated with a radioactive source of ionizing particles, such as a polonium layer, which faces one surface of the web. The opposite surface of the web 15 is contacted by a ground plate 54, while voltage source 53 as tapped by a potentiometer 55 is connected to the electrode 52. The potentiometer 55 is center-tapped to ground, and the battery of voltage source 53 is preferably one hundred to several hundred volts. By varying the potentiometer setting, one can thus establish a field of either polarity and of adjustable intensity between electrode 52 and web 15.

The alpha or other ionizing particles emitted by the radioactive layer on electrode 52 produce ionization of the air in the chamber 51 into negative and positive ions, and these ions migrate in opposite directions, depending on their polarity, under the influence of the electrostatic field existing between electrode 52 and plate 54. As ions of one polarity deposit their charge on web 15, the field becomes altered by the charge on the web until a state of equilibrium is reached, in which the potential of the web surface is equal to the potential applied to electrode 28 by the potentiometer. Whether a small positive potential or negative potential is applied to the web, as controlled by the setting of the potentiometer tap, depends on factors subsequently considered. In some instances the electrode 28 may be held at ground potential, in which case the device merely serves to remove incidentally acquired electrostatic charges from the web in preparation for receiving the electrostatic intelligence charge pattern. Instead of a radioactive source of ionizing particles, the electrostatic charges may be supplied by corona emission as disclosed, for example, in U.S. 2,777,957 to L. E. Walkup.

With the web 15 thus prepared, it passes between discharge electrodes 18 and ground or backing plate 16. The backing plate 16 may be a flat plate as shown in FIG. 4, a roller as shown in FIG. 1, a knife edge, etc. The web is preferably held in contact with the base plate 16, but spaced by a very small gap, of the order of 2–3 mils, from the discharge electrodes 18. Under these conditions, and using a potential difference of about 750 volts between backing plate 16 and electrodes 18, a silent or field discharge occurs between the energized electrodes 18 and the surface of the web, establishing a controllable and localized electrostatic charge on the web opposite the energized discharge electrode. The polarity of electrostatic charge on the web is, of course, determined by the polarity of the discharge electrodes.

The web 15 now carrying the intelligence in electrostatic charge form, passes into the developer 56, shown in detail in FIG. 5. This device comprises a pair of rollers 60 and 65. Roller 60 includes a central bearing shaft 64 carrying a pair of axially spaced disks 62 over which the web edge peripheries pass. Flanges 61 confine the web in place on disks 62. The web and disks 62 thus form a hopper in which a supply of electroscopic powder 63 is contained. It is preferable, although not necessary, that the powder 63 be charged by triboelectric or other means to carry an electrostatic charge opposite from that established on the web by the transducing discharge electrodes 18. The powder adheres in the areas charged by electrodes 18, to produce a visible presentation of the intelligence carried by the web. As the powder 63 is tumbled over the web 15, if the initial preliminary charging of the web at 51 were of a polarity opposite from that at the electrodes 18, then this background charge on the web would be of the same polarity as the charged powder, and would assist in repelling the developer powder from this background area. After being developed, the web passes from roller 60 up over roller 65, and down into fuser 57. In fuser 57 the web passes about roller 58 where it is heated to a temperature sufficient to fuse the developer powder to the web, or, if ink were used as the developer, to dry the ink thereon, thus forming a permanent visual and directly readable record of the intelligence transduced at electrodes 18. The web may then pass between suitable drive rolls such as 80.

Figure 1A:
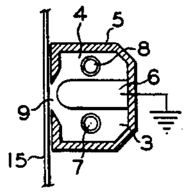

The described method of rendering the pattern of electrostatic charges visible, i.e., developing the image, is known as "loop" development. This system is disclosed in U.S. 2,761,416 to C. F. Carlson. The method of development is not critical in the instant invention and other methods for contacting electrostatically charged marking particles with the electrostatic latent image may be used. Thus, a spray of electrostatically charged liquid droplets or dry powder particles, as disclosed in U.S. 2,784,109 to L. E. Walkup may be used or magnetic brush development described in U.S. 2,791,949 to Simmons and Saul are all operable. A powder cloud development apparatus particularly suited for use as element 17 of FIG. 1 is the device known as a slot development apparatus more particularly described in U.S. patent application S.N. 485,408 filed February 1, 1955, by C. F. Carlson. As can be seen in FIG. 1A the device includes a chamber running the width of image member 15 and formed by walls 5, the chamber being divided into an entrance chamber 3 and an exit chamber 4 by conductive electrode 6 which is positioned under aperture 9 in walls 5 directly opposite in close spaced relationship to image member 15. The distance between member 15 and electrode 6 is no more than about ⅛-inch and desirably is no more than about 1/40-inch. At these spacings electrode 6 draws the lines of force of the electrostatic image externally above the surface of member 15. Electrostatically charged marking particles as from a powder cloud generator enter chamber 3 through entrance means 7 and are channelled by walls 5 to flow around electrode 6 into chamber 4 and thence through exit means 8 to a collecting box, or other disposal means. While passing through space 9, the particles are attracted to the electrostatic image and deposit thereon to render an accurate, visible reproduction thereof all as more fully and completely described in the said application of C. F. Carlson. Devices such as this have been made wherein the development system is limited to ¼ inch thereby making possible almost instantaneous viewing of the developed image. The choice of the particular developing process or apparatus would be dependent on the combination and design limitations imposed in assembling the machine for a particular operation.

Similarly, the means of permanently affixing the powder image to the backing material is not critical in the instant invention. Thus, if no permanent image is desired, after examination of the roll, the loosely adhering powder image may be wiped off as by swabbing with cotton and the roll reused. If a permanent record is desired, the powder particles may be rendered adherent to the backing material by heating, as previously disclosed herein, by contacting the powder-bearing sheet with the vapors of a solvent for the marking particles or for a resin coating on the image receiving member as disclosed for example in U.S. 2,776,907 to C. F. Carlson. Where liquid droplets are used, absorption of the liquid into the capillaries of the backing member or an evaporation of the liquid would serve to affix the image to the image receiving sheet. Other means of affixing the powder image, as by the use of pressure, by spraying with a fixative liquid, etc., also may be used if desired.

The apparatus of the instant invention is unrivaled in the versatility of operation made available. The device accurately records a series of time dependent electrical pulses while faithfully preserving the time relationship in terms of accurate spacing on the recording medium. Any type of information presented in terms of electrical pulses may be printed by the instant device, including such widely variant examples as alphanumerical characters, abstract symbols of any type such as mathematical, chemical, etc., audio signals and so on up to very high quality half-tone reproductions equal or better in quality to that obtainable in present radar and TV presentations. The number of electrode elements per linear inch in the electrode array will depend on the number of bits, i.e., the fidelity, of recording which it is desired to obtain.

Figure 1B:
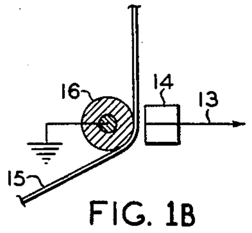

A number of interrelated factors determine the quality of reproduction obtainable in the instant device. One of these elements is the gap spacing, that is, the distance between the recording member and the electrode array. As can be seen in FIG. 1B, the array may be designed so that the electrodes are flush with the outer surface of array 14. This permits rigidity of construction for fine electrodes and accurate spacing of the gap without affecting the efficiency of electrostatic transfer. In general, it has been found that the electrostatic potential required for charge to transfer across an air gap is dependent on the width of the gap for any given electrostatic system. This potential reaches a minimum in the neighborhood of a particular spacing which is generally in the range of 10 to 30 microns. For shorter gaps the voltage required for charge transfer increases asymptotically so that at spacings of about 2 microns charge transfer becomes virtually impossible in any practicable system. As the air gap increases, the potential required for charge transfer also increases but at a more gradual rate than when the gap is decreased in width from this minimum value. However, increasing gap width results in spreading and loss of resolution of the electrostatic image transfered to the transfer member. In general, spacings of from about 5 to about 150 microns may be used with a particular preferred range of gap width being from about 15 microns to about 100 microns. Shorter spacings place additional and unnecessary strain on the mechanical design of the system to assure the reliability of gap spacing and increase the voltage required for reliable electrostatic transfer. The practical limit on the upper side for the gap spacing is largely determined by the image quality desired. The spacings given herein are practical limitations for obtaining good quality reproduction.

The minimum potential required to obtain charge transfer across an air gap will be slightly greater than the breakdown potential of air for the air gap used. In general, the determining factor is the relationship of the capacitance of the transfer member compared to the capacitance of the discharge electrode to ground. Representative values required to initiate charge transfer are within the range of 600 to 1,000 volts. In order to simplify the design of the pulse circuitry a "bias" may be applied to the air gap by placing a constant D.C. potential between the backing electrode 16 and the discharge electrodes 14 which voltage is close to but insufficient in magnitude to initiate charge transfer. The use of a bias has the disadvantage of sweeping ions from the gap so that when the pulse is applied it must be of greater magnitude than simple addition to the bias potential would indicate if reliability of discharge is to be assured for short pulses.

Only the voltage over that required to initiate breakdown is transferred across the gap. Thus, if the air breakdown potential is —800 volts and we apply a potential of —1,000 volts to the gap, only about —200 volts would be transferred.

A second factor affecting discharge is the width of the pulse applied to the discharge electrode. Increasing the magnitude of the applied voltage will improve reliability. However, care must be taken not to transfer excessive charge to the transfer member as Lichtenberg figures appear in the developed image. Lichtenberg figures are due to the inability of the surface of the transfer member to sustain the lateral potential gradient. Breakdown, therefore, occurs on the recording surface and the charge spreads laterally. On development, this spreading of charge manifests itself in image deformities referred to as Lichtenberg figures, or "treeing." For pulses of 10 microseconds or longer duration, breakdown occurs reliably. Down to about 5 microseconds, there is a decrease in reliability but the system still operates satisfactorily. As pulse width decreases below this value, reliability drastically falls off. The electrostatic discharge itself takes at least about 0.01 microsecond and this sets a definite lower limit on pulse width. It has been observed that negative polarity pulse voltages permit the use of significantly higher pulse voltages without "treeing" than if positive polarity pulses are used.

It is advisable to use pulses of far greater magnitude than required to transfer the minimum charge sufficient to give powder images of adequate density. Thus, depending on the development system used, a potential of 50 volts or less will give a readable image. However, in practical operation of the system, excellent results are obtained using a bias on an 80 micron air gap of —1,000 volts with pulses of —500 volts. For short pulses (2 microseconds or less) a pulse voltage of —1,000 has been used without "treeing" or objectionable deterioration in image quality.

Reliability of discharge on application of the voltage pulse can be further improved by increasing the number of ions in the air gap. The breakdown of the air gap by a short voltage pulse is, of course, dependent on the statistical fluctuations of the quantity of ambient ionization in the gap. Increasing the ambient ionization therefore increases the reliability of breakdown on the application of the short voltage pulse. One method of doing this is to irradiate the gap with ultraviolet light.

The output impedance of the circuit employed to pulse the air gap is of particular importance: the lower the output impedence the greater the reliability of image formation in the situation where electric fields of moderate strength are applied to the gap. For example, in the very simplest situation where the air gap is connected in series with a switch, a resistor, and a battery, image formation can be "throttled" through the use of a high impedance resistor. In general, the resistance should not be greater than about 100,000 ohms and it is preferred to have it as low as possible. The discharge electrode may be connected directly to B+ in the output circuit wherein B+ acts as a partial bias on the air gap. If a blocking condenser is used in the discharge circuit, it must not be so small as to present an impedance high enough to "throttle" the discharge. Thus, for 2,000 volts on an 80 micron gap, the condenser in series with the electrode should be at least 40 micromicrofarads and preferably is 100. The use of a blocking condenser may also be helpful in preventing "treeing." Where a bias is used, at least part of the bias potential should be applied to the backing electrode 16. It has been found that discharge is facilitated if neither the discharge nor backing electrode is grounded. An alternative method of biasing the gap is to apply a uniform electrostatic charge to the insulating transfer member as shown in FIG. 4.

Finally, handling of the transfer member almost necessarily produces random electrostatic charges thereon due to a variety of causes such as triboelectrification, etc. Unless steps are taken to nullify these random charges, they will be developed to give spurious results interfering with the legibility of the desired information. Accordingly, it is desirable to provide suitable means for eliminating these charges. This can be done by a variety of means known to those skilled in the art, such as providing an A.C. controlled corona discharge just prior to the passage of the transfer member through the charge transfer station between the electrode array 14 and backing electrode 16 shown in FIG. 1.

While the invention has been discussed herein in terms of controlled electrostatic discharge across an "air" gap, it is understood that any type of gas may be used which is not corrosive under the conditions of use. Thus, nitrogen, argon, carbon dioxide, etc., may be used in the gap.

From the foregoing illustrative specific embodiments, it will be appreciated that by the present invention there is provided a system for analyzing and transducing into visual and directly readable record form, intelligence obtained in electrical amplitude- or pulse-time division form. It is understood that the foregoing specific examples of the system are presented merely by way of example to facilitate a complete understanding of the present invention. Since various equivalents and modifications of the instant embodiments will be apparent to those skilled in the art, such as are within the spirit and scope of the appended claims are considered to be embraced by the present invention.

What is claimed is:

1. An information handling system comprising: means for analyzing electrical intelligence applied thereto in the form of a time sequence of information bit signals having a keyed relation to a time reference, said analyzing means including a plurality of individual electrostatic charge-transferring transducers having a predetermined pattern of relative spatial arrangement, a backing electrode in uniform, closely spaced relation to said transducers, electrical circuit means for coupling individual electrical information bit signals to selected transducers, said circuit means including signal delay means adapted to delay the bit signals arriving at each said transducer by an increment of time related to the relative spatial position of each said transducer to spatially distribute said time sequence of bit signals to selected ones of said transducers and means to simultaneously activate each transducer by a common time reference signal to cause a space discharge only between said selected transducers and said backing electrode while activated by said time reference signal, and means for recording the intelligence as applied to said transducers, said recording means including means for directing an electrically insulating sheet material between said transducers and backing electrode with one surface of said sheet material in closely spaced relation to all said transducers; whereby discharge between said transducers and backing electrode in accordance with the electrical information bits coupled thereto results in the formation of a directly readable pattern of electrostatic charge on said sheet material denoting the intelligence applied to the system.

2. A system as defined in claim 1, wherein said recording means further includes means for developing the electrostatic charge pattern formed on said sheet material, whereby said intelligence is rendered visible.

3. A system as defined in claim 1, wherein said circuit means comprises a delay line, a plurality of output taps at spaced intervals thereon, and means coupling the taps individually to respective transducers.

4. A system as defined in claim 3, wherein said tap coupling means comprises a coincidence gating means for each said tap means having means for receiving delay line outputs through the respective tap means as one input and means for receiving an additional signal as a second input, and means for applying said additional signal simultaneously to all the gating means.

5. An information handling system comprising: means for analyzing electrical intelligence applied thereto in the form of a time sequence of information bit signals having a keyed relation to a time reference, said analyzing means including a plurality of individual electrostatic charge transferring transducers in uniformly spaced linear array, a backing electrode in uniform closely spaced relation to said transducers, electrical circuit means for coupling individual electrical information bit signals to selected transducers, said circuit means including signal delay means adapted to delay the bit signals arriving at each said transducer by uniform increments of time related to the relative spatial position of each said transducer to spatially distribute said time sequence of bit signals to selected ones of said transducers and means to simultaneously activate each transducer by a common time reference signal to cause a space discharge only between said selected transducers and said backing electrode while activated by said reference signal, and means for recording the intelligence as applied to said transducers, said recording means including means for directing an electrically insulating sheet material between said transducers and backing electrode with one surface of said sheet material in closely spaced relation to all said transducers; whereby discharge between said transducers and backing electrode in accordance with the electrical information bits coupled thereto results in the formation of a directly readable pattern of electrostatic charge on said sheet material denoting the intelligence applied to the system.

6. A system as defined in claim 5, wherein said analyzing means circuit comprises a ring counter chain having a plurality of stages and having means for applying stepping signals thereto to step the chain stage by stage, and means coupling outputs from each of said stages along separate channels to respective transducers.

7. A system as defined in claim 6, wherein said means coupling the outputs of the ring counter chain stages along separate channels to respective transducers comprises in each said channel a coincidence gating means including means for receiving a counter chain stage output as one input and means for receiving an additional signal as a second input, and means for applying said additional signal simultaneously to all the gating means.

References Cited in the file of this patent

UNITED STATES PATENTS

| | | |
|---|---|---|
| 2,639,209 | Gamerekian | May 19, 1953 |
| 2,656,524 | Gridley | Oct. 20, 1953 |
| 2,683,239 | Rieber | July 6, 1954 |
| 2,708,615 | Greenleaf et al. | May 17, 1955 |
| 2,736,770 | McNaney | Feb. 28, 1956 |
| 2,739,865 | Willey | Mar. 27, 1956 |
| 2,771,336 | McGriff | Nov. 20, 1956 |
| 2,777,745 | McNaney | Jan. 15, 1957 |
| 2,919,171 | Epstein et al | Dec. 29, 1959 |

FOREIGN PATENTS

| | | |
|---|---|---|
| 734,909 | Great Britain | Aug. 10, 1955 |

OTHER REFERENCES

Publication: "The Burroughs Electrographic Printer Plotter for Ordnance Computing" by H. Epstein and P. Kintner; paper given at the Eastern Joint Computer Conference, December 10–12, 1956; copy reprinted from Special Publication T–92.